No. 699,320. Patented May 6, 1902.
DE KERNIEA J. T. HIETT.
ADDING MACHINE.
(Application filed Nov. 21, 1900.)
(No Model.) 11 Sheets—Sheet 4.

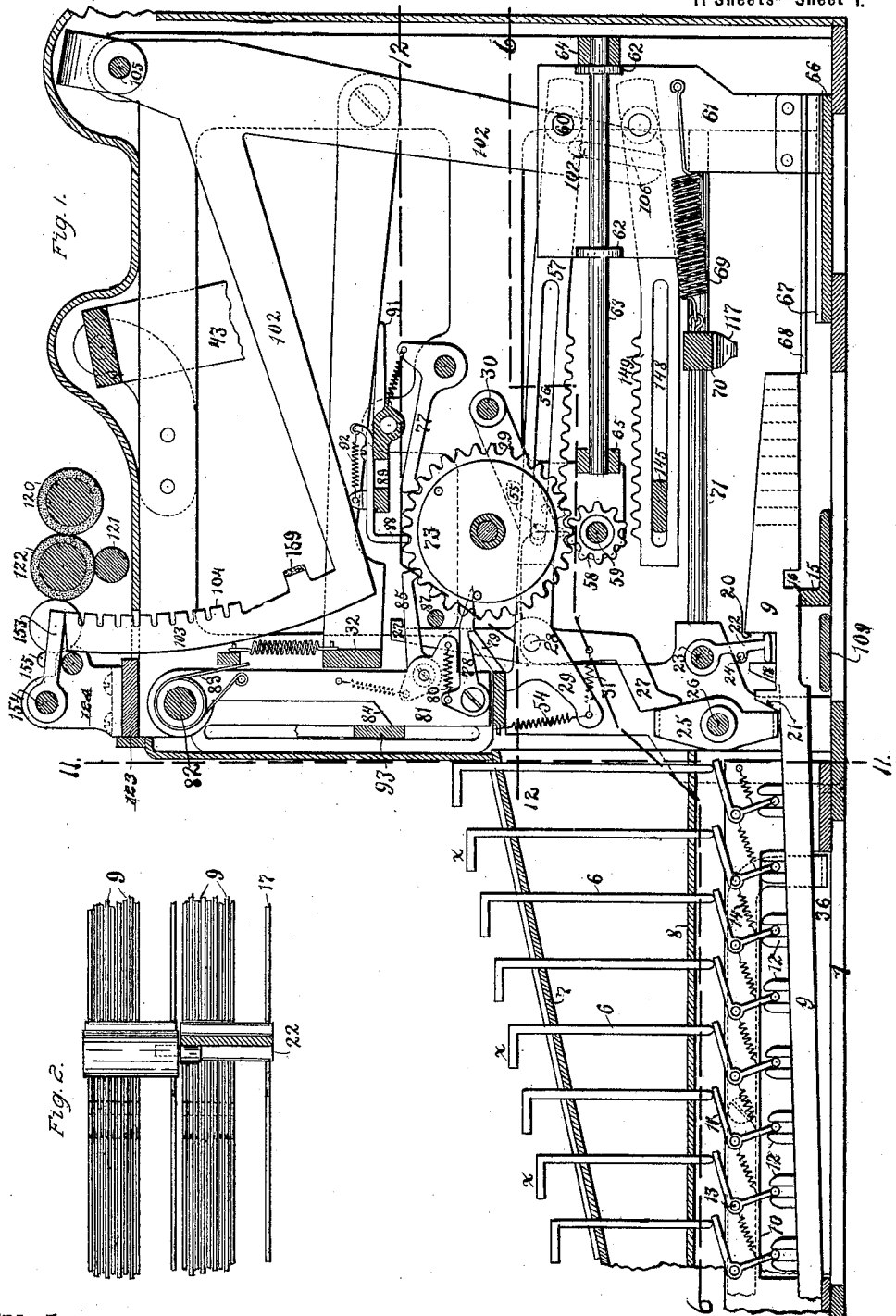

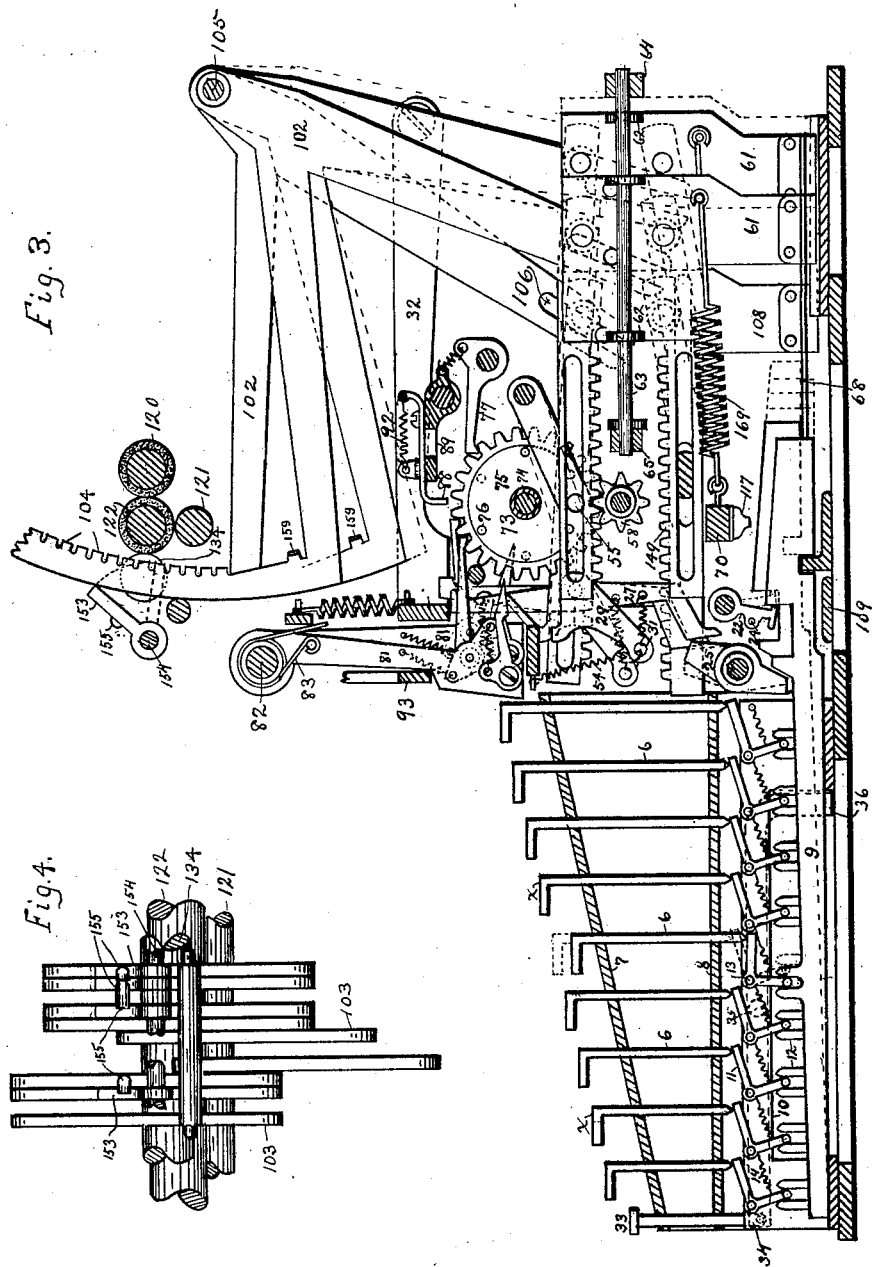

Attest.
J. E. Rickman
John H. Lutz Jr.

Inventor
De Kerniea J T Hiett
By Halcolm G. Ellis
Attorney.

No. 699,320. Patented May 6, 1902.
DE KERNIEA J. T. HIETT.
ADDING MACHINE.
(Application filed Nov. 21, 1900.)
(No Model.) 11 Sheets—Sheet 5.
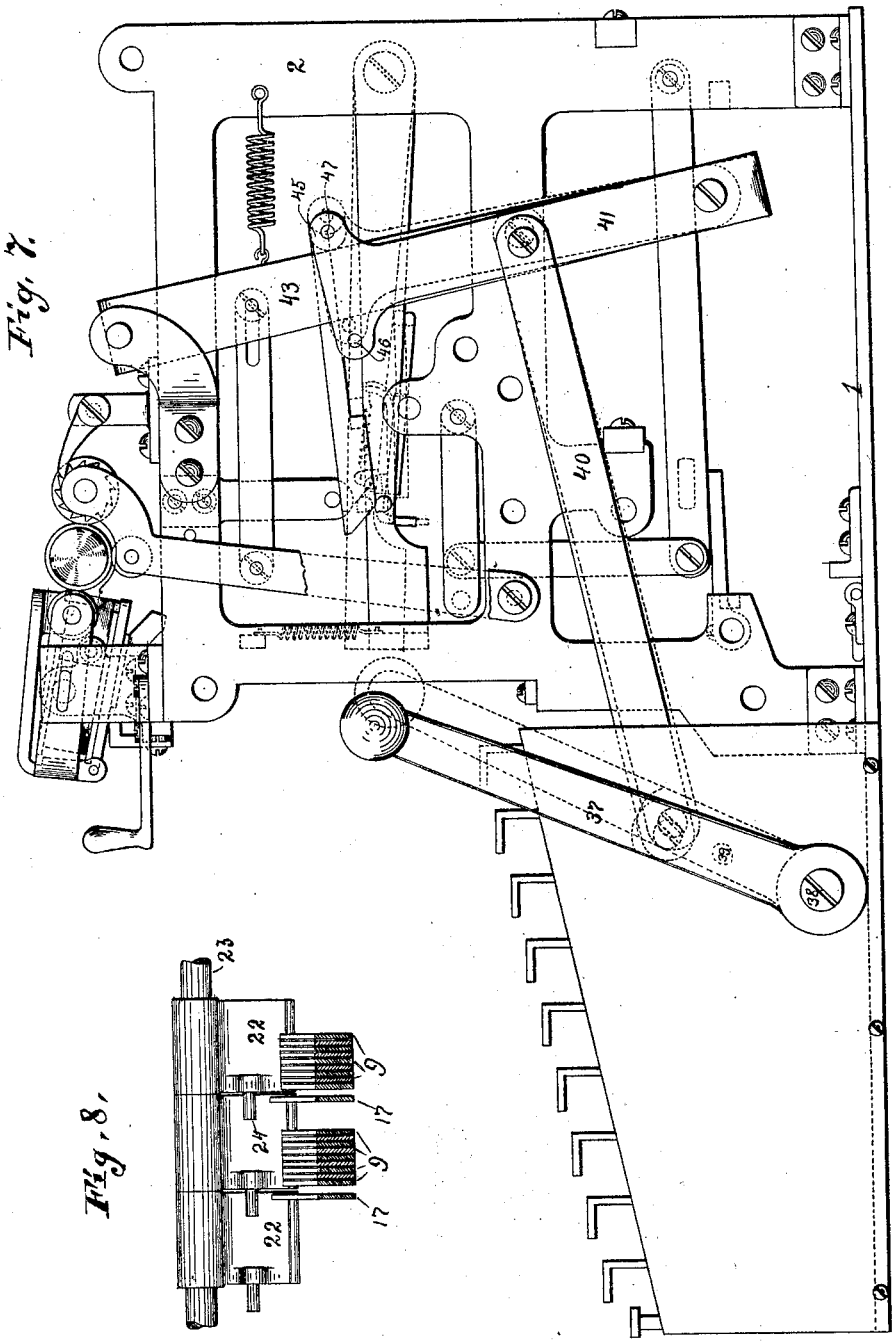

No. 699,320. Patented May 6, 1902.
DE KERNIEA J. T. HIETT.
ADDING MACHINE.
(Application filed Nov. 21, 1900.)
(No Model.) 11 Sheets—Sheet 6.
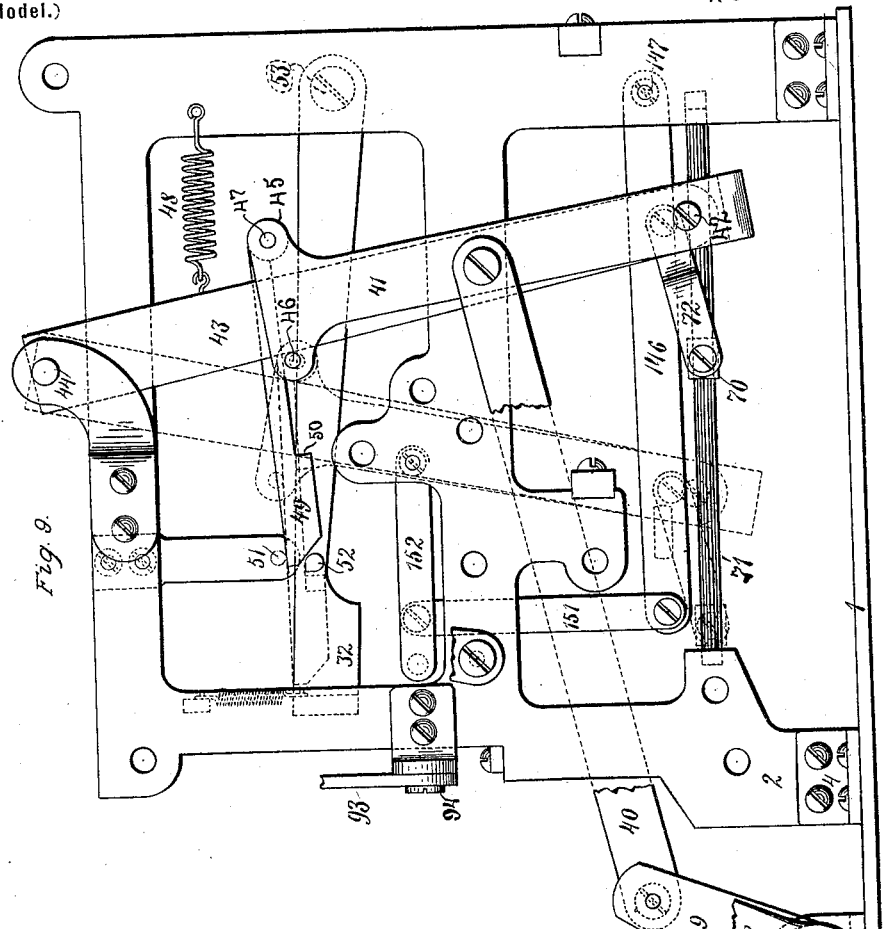
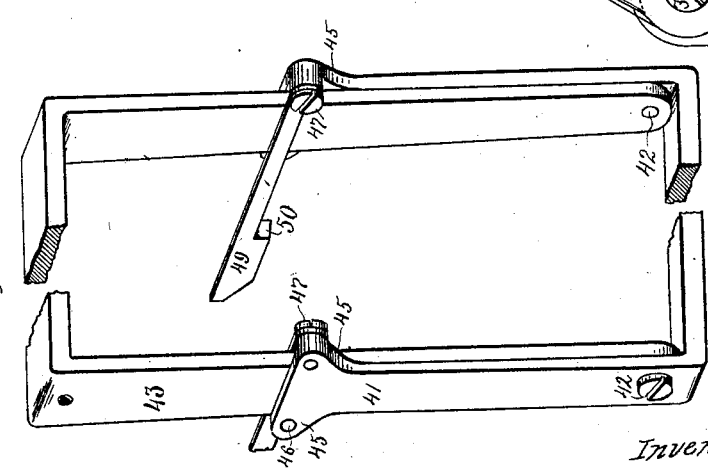

No. 699,320. Patented May 6, 1902.
DE KERNIEA J. T. HIETT.
ADDING MACHINE.
(Application filed Nov. 21, 1900.)
(No Model.) 11 Sheets—Sheet 7.
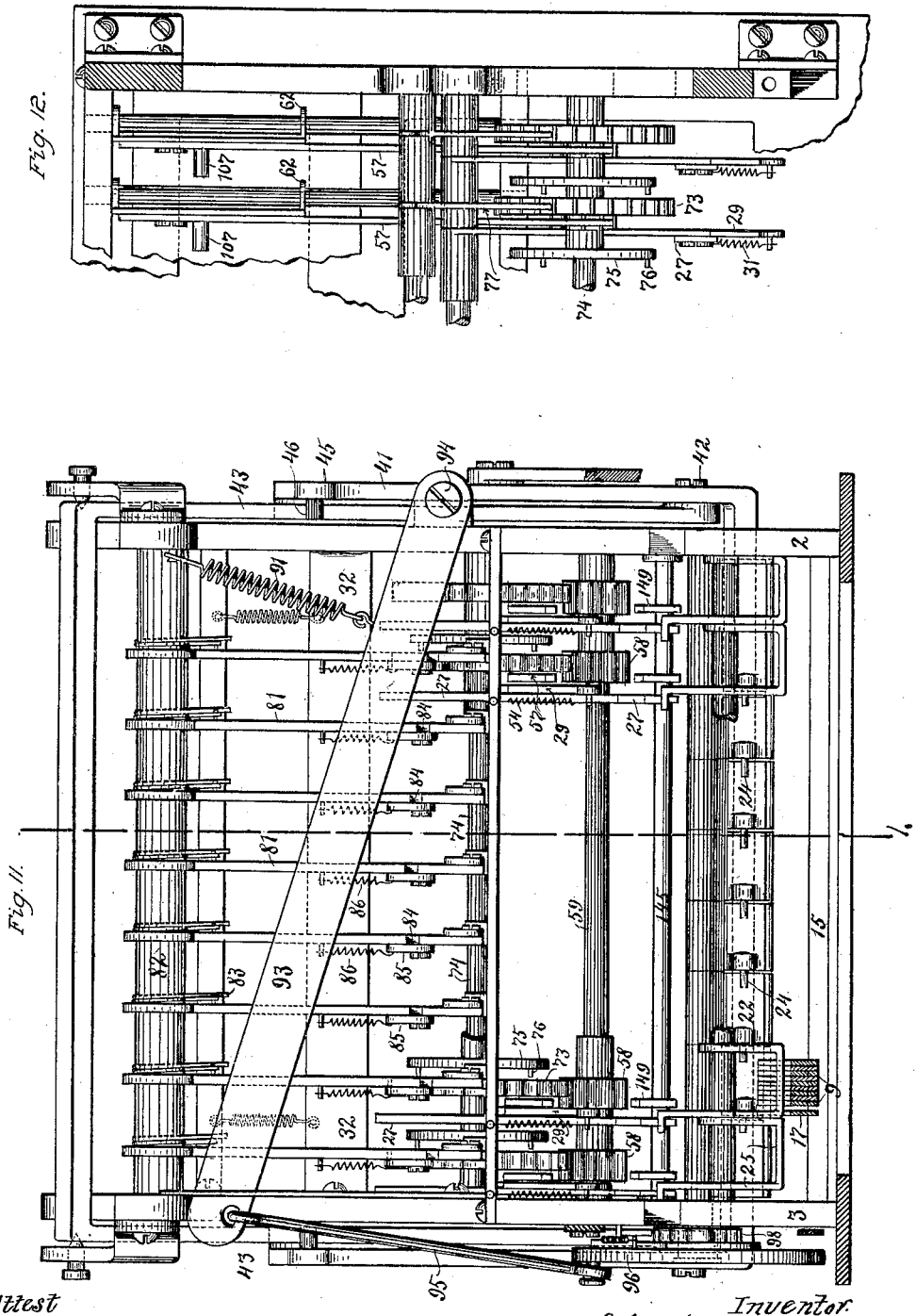

No. 699,320. Patented May 6, 1902.
DE KERNIEA J. T. HIETT.
ADDING MACHINE.
(Application filed Nov. 21, 1900.)
(No Model.) 11 Sheets—Sheet 8.
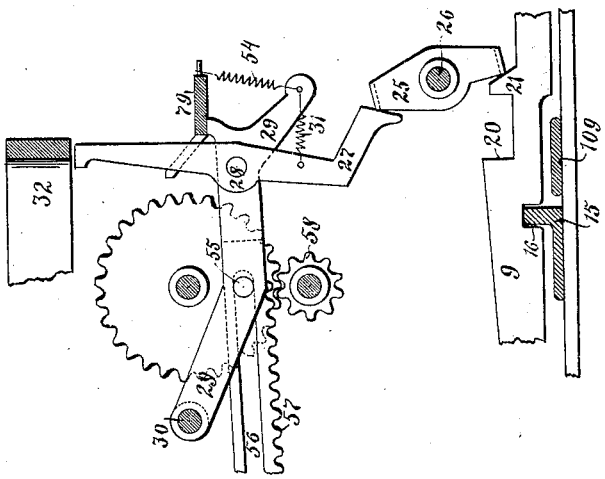
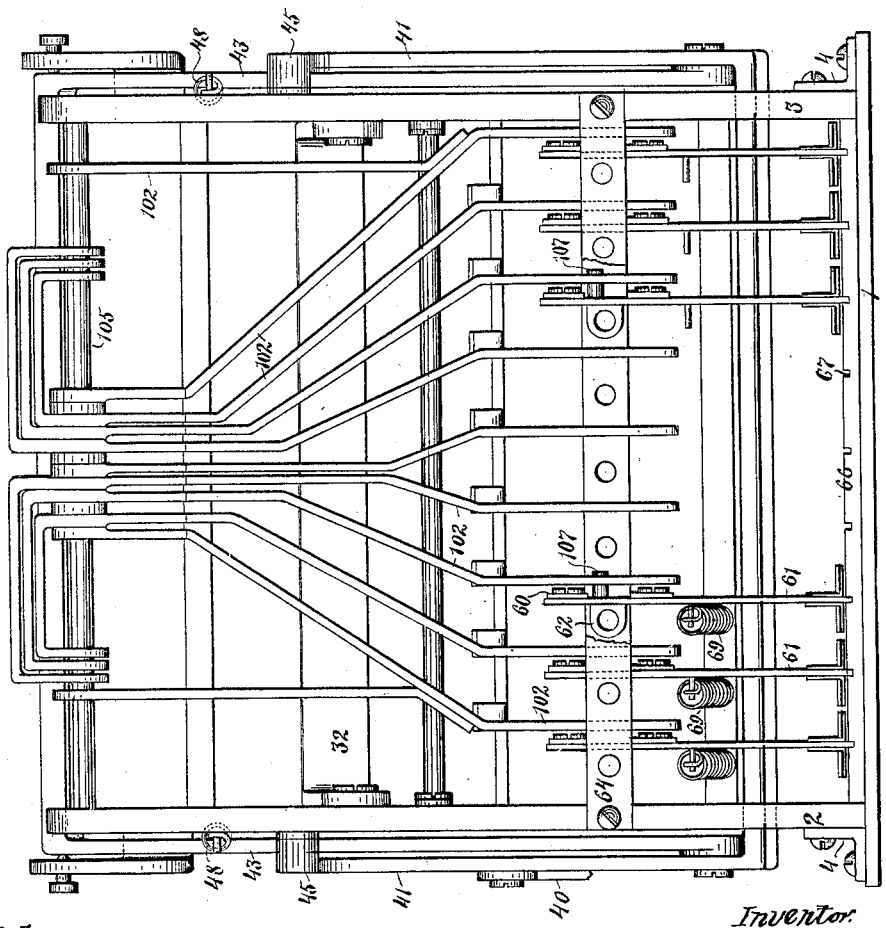

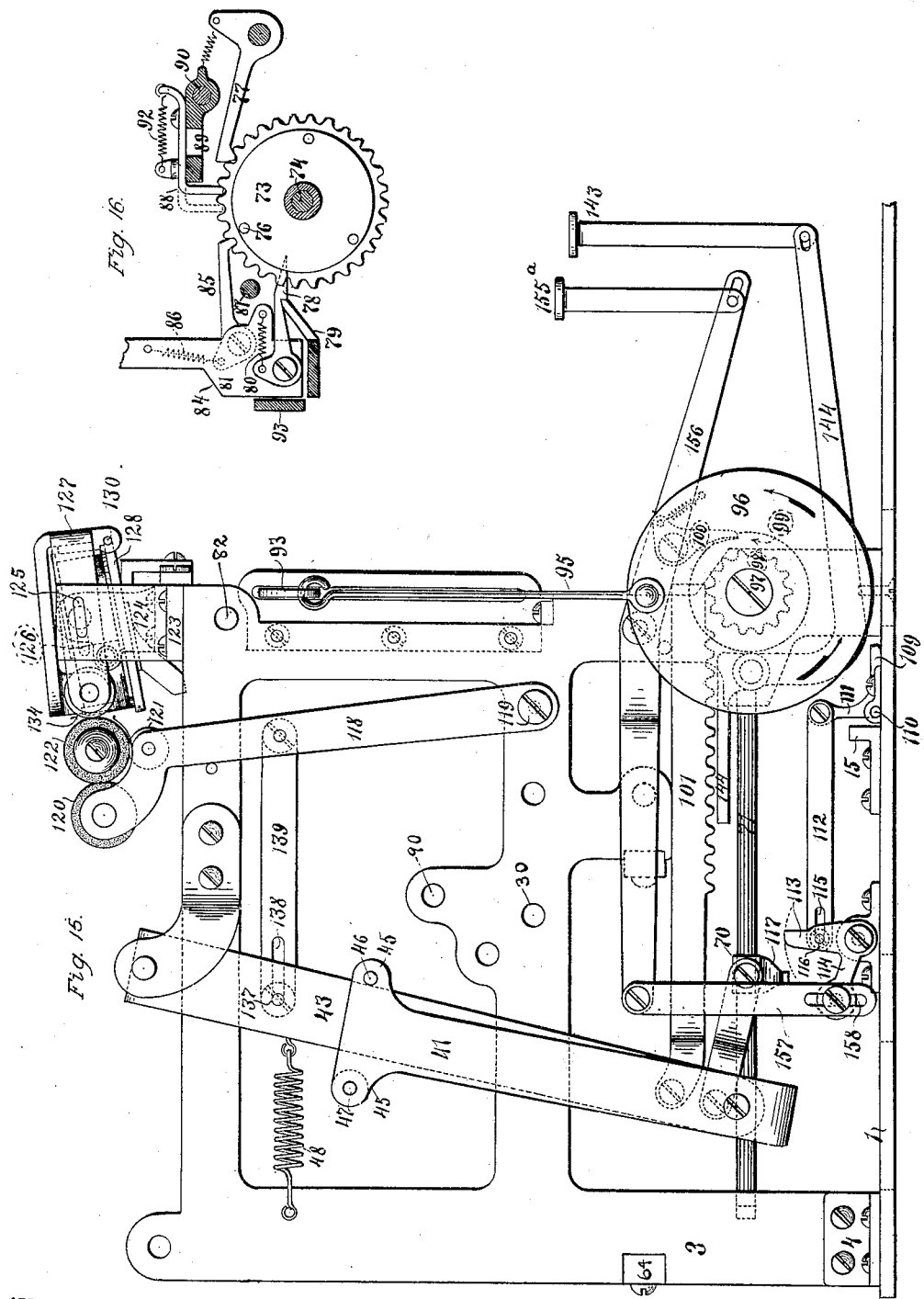

No. 699,320. Patented May 6, 1902.
DE KERNIEA J. T. HIETT.
ADDING MACHINE.
(Application filed Nov. 21, 1900.)
(No Model.) 11 Sheets—Sheet 10.
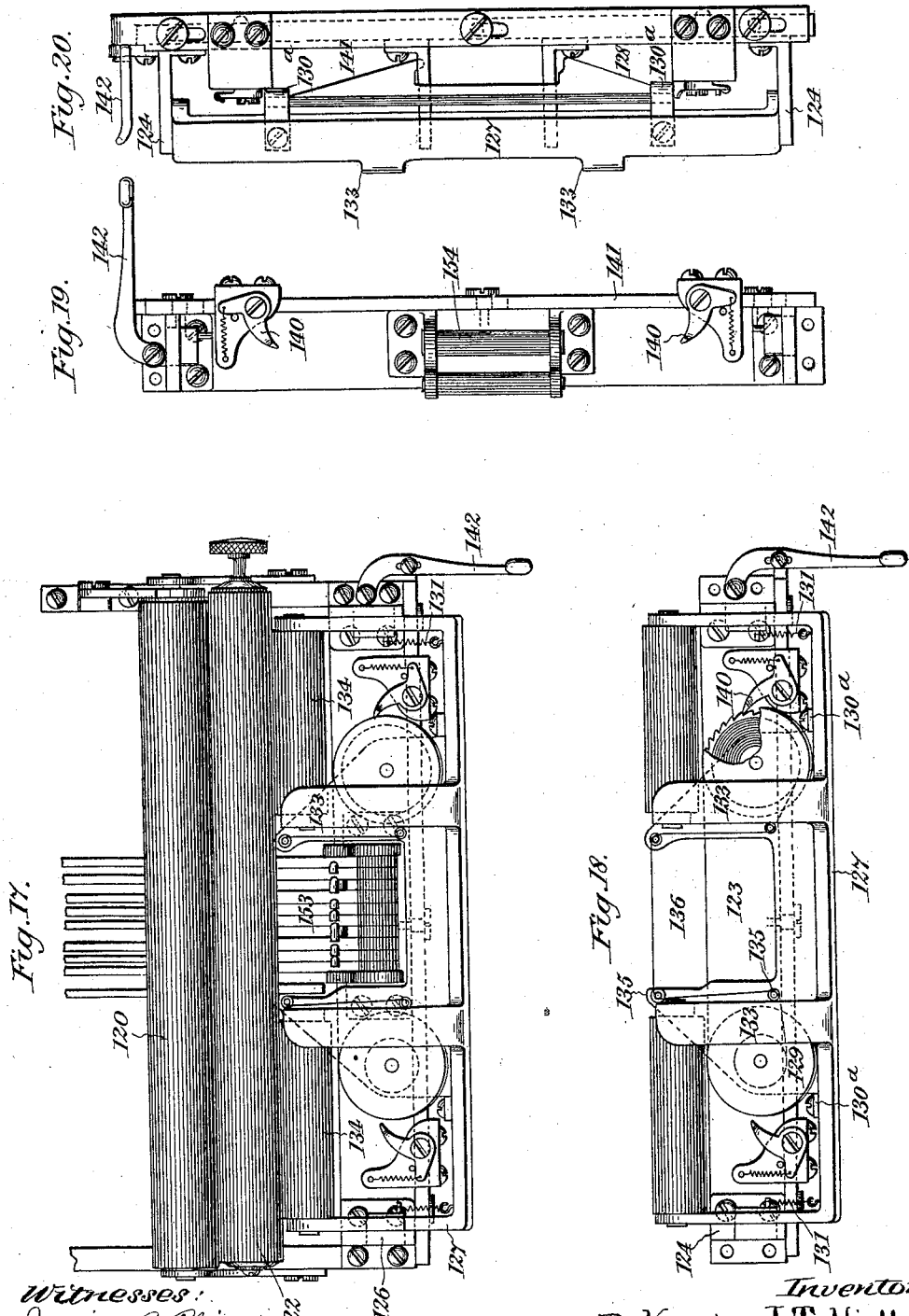
Witnesses:
Julius J. Winter
Geo. B. Drown
Inventor:
DeKerniea J. T. Hiett
by Halcolm G. Ellis
Atty No. 699,320. Patented May 6, 1902.
DE KERNIEA J. T. HIETT.
ADDING MACHINE.
(Application filed Nov. 21, 1900.)
(No Model.) 11 Sheets—Sheet 11.
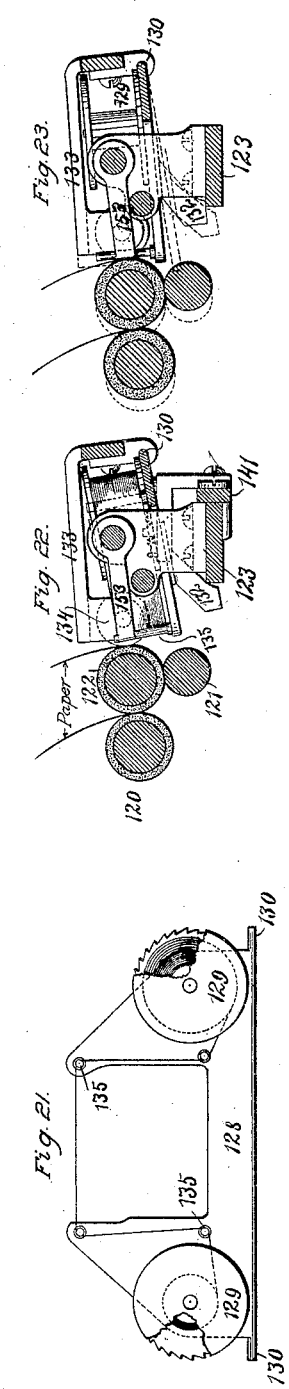
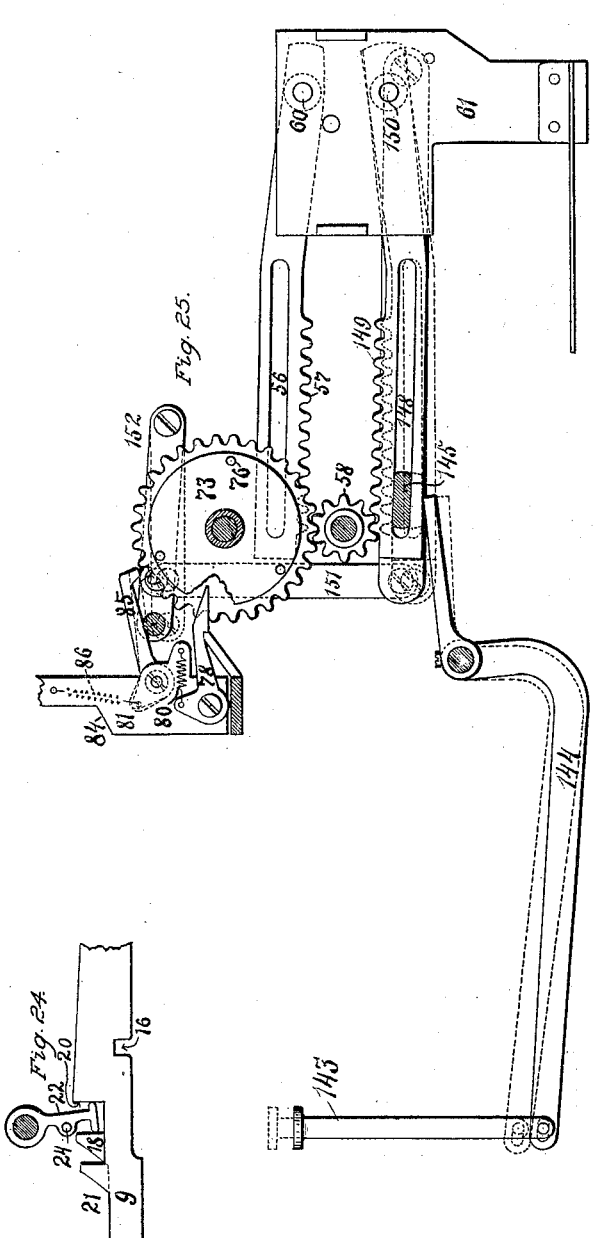
Attest
L. C. Rickman
John A. Lutz Jr.
Inventor
De Kerniea J. T. Hiett
By Halcolm G. Ellis
Attorney.

UNITED STATES PATENT OFFICE.

DE KERNIEA J. T. HIETT, OF ST. LOUIS, MISSOURI, ASSIGNOR TO THE NEW HIETT MACHINES MANUFACTURING COMPANY, OF ST. LOUIS, MISSOURI, A CORPORATION OF MISSOURI.

ADDING-MACHINE.

SPECIFICATION forming part of Letters Patent No. 699,320, dated May 6, 1902.

Application filed November 21, 1900. Serial No. 37,308. (No model.)

*To all whom it may concern:*

Be it known that I, DE KERNIEA J. T. HIETT, a citizen of the United States, residing in the city of St. Louis, State of Missouri, have invented a certain new and useful Calculating-Machine, of which the following is a specification.

This invention relates to that class of adding-machines known as "recording-calculators," and has for its object the production of a machine having a mechanism with a positive relation between the accumulators or adding device and the recording or printing device, so that it will be a mechanical impossibility to add one amount and print a different amount. To accomplish this end, various features of novelty are introduced, which will be more particularly pointed out and described in the specification, reference being had to the accompanying drawings, forming part thereof, in which—

Figure 5:
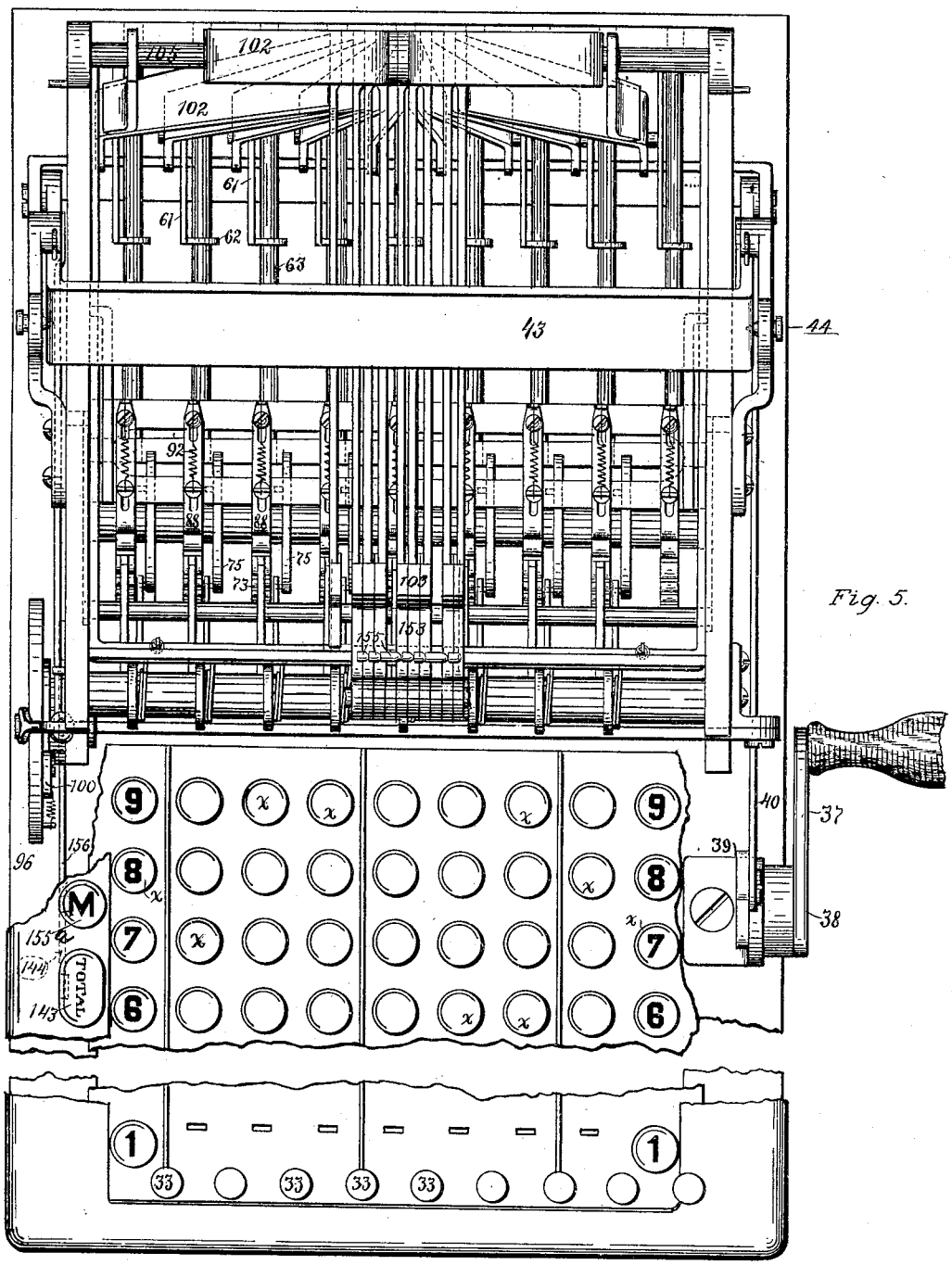
Figure 6:
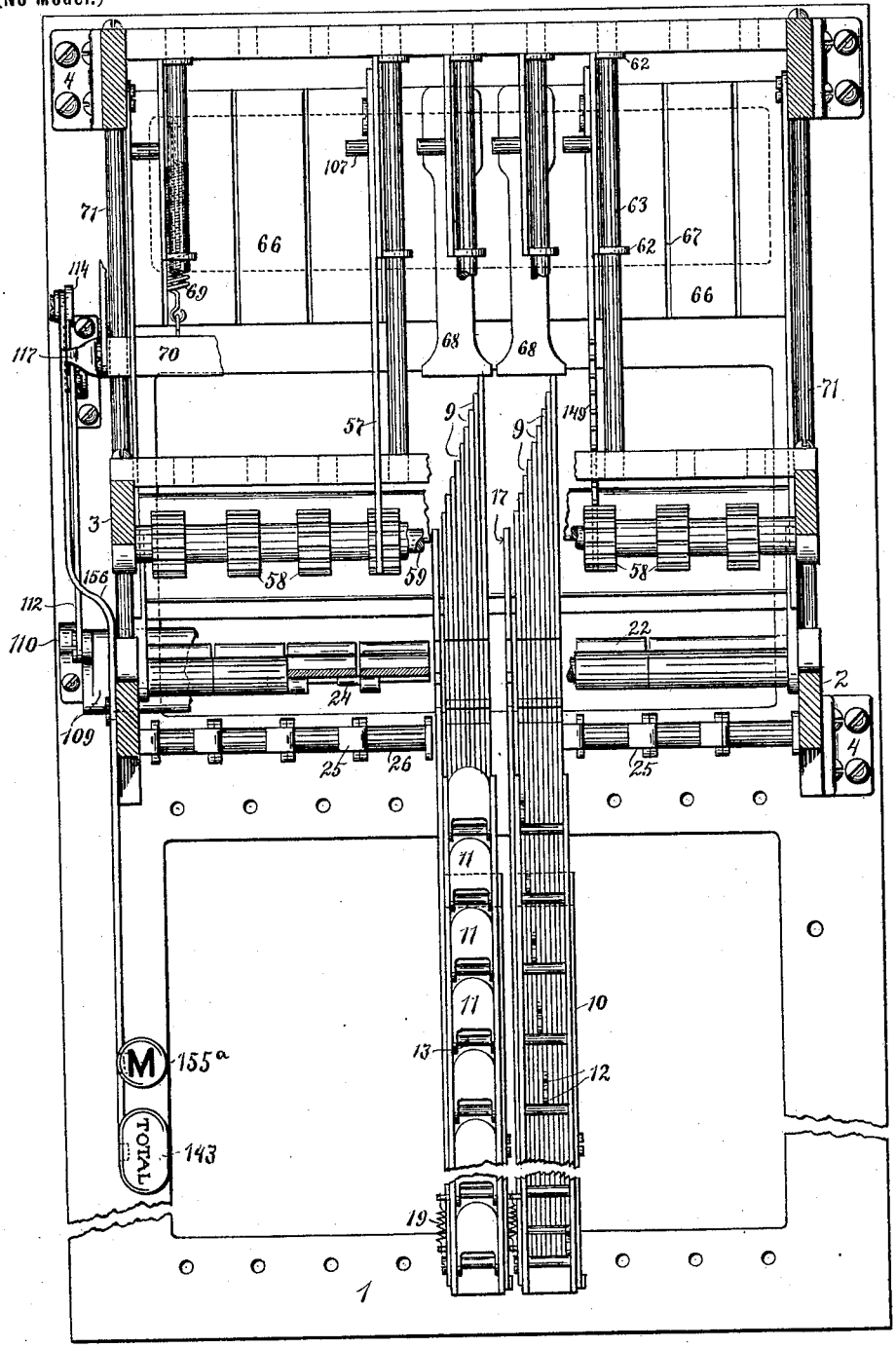

Figure 1 is a vertical longitudinal section on the line of 1 1 of Fig. 11, showing the machine at rest. Fig. 2 is a detail plan of the pendulum device. Fig. 3 is a vertical longitudinal section on the line of 1 1 of Fig. 11, showing the machine with several keys in operation and case removed. Fig. 4 is a front view of the "0" printing device. Fig. 5 is a plan view of the entire machine, part of the keyboard broken away and case removed. Fig. 6 is a horizontal section on line below the accumulator-wheels on the line 6 6 of Fig. 1, with parts removed for sake of clearness. Fig. 7 is a side view showing handle with case removed. Fig. 8 is a front detail view of pendulums. Fig. 9 is a side view of the frame of the machine, showing action of the shuttle. Fig. 10 is a detail view showing the shuttle and lost-motion device. Fig. 11 is a front elevation with keyboard removed, showing chafing-bar, taken on the line 11 11 of Fig. 1. Fig. 12 is a detail horizontal section above the accumulator-wheel on the line 12 12 of Fig. 1. Fig. 13 is a back view showing the type-sectors. Fig. 14 is a detail showing the upper rack-engaging levers. Fig. 15 is a side elevation showing the total-key and multiplying-key and their connections. Fig. 16 is a detail showing the operation of the limit-pawl. Fig. 17 is a top view of the printing device, including rollers. Fig. 18 is a top view of the printing device removed from the machine. Fig. 19 is a detail view of the ribbon-feed device. Fig. 20 is a front view of the loop for carrying the printing-ribbon. Fig. 21 is a detail of the ribbon-reels. Fig. 22 is a vertical section through the printing-rolls, showing the machine at rest. Fig. 23 is a similar section to Fig. 22, showing the machine in the act of printing. Fig. 24 is a detail side view of the pendulum 22. Fig. 25 is vertical section detail showing operation of the total-key and its rack.

The machine is inclosed within a case at the top and near the front of which is a set of rollers for accommodating the paper upon which the figures are to be added and the totals are printed. In front of the rectangular part of the case extends the keyboard, the keys being arranged in columns extending from the front of the machine back to the end of the keyboard. There are nine keys in each column, the front key being numbered "1," the successive keys "2," "3," "4," &c., to the last key, which is numbered "9." There can be as many columns of these keys placed side by side as desired. In the drawings nine are shown, the right-hand column being units of cents, the second being the tens of cents, the third the units of dollars, the fourth the tens of dollars, &c. In the following description the column of keys and its corresponding mechanism next to the left will be referred to as the "column above." The keys in each column have the same numbers thereon, forming nine steps from the front of the keyboard to the back. Now since all the keys in each step bear the same figure it is only necessary when adding to determine which column is hundreds, which tens, which units, &c., in order to strike the right key in adding any given amount. Between the tens-of-cents and the units-of-dollars columns there is usually placed upon the keyboard a column-ruling to correspond with the column-ruling in a ledger. This column-ruling is for the purpose of assisting the eye to quickly locate the column in which any particular figure we wish to add may be. For instance, in order to add five hundred to another amount previously registered in the machine it is only necessary to strike the key numbered "5" in the hundreds-column. This will cause the machine automatically to add five hundred to the amount previously accumulated and print "500" in the adding-column. The "0's" of the "500" will be automatically placed after the "5."

The appearance of the machine somewhat resembles the ordinary type-writer, having the keyboard in front and the paper rollers above. The printing, however, is immediately visible after the operation of adding without lifting the carriage, as is necessary in the ordinary type-writers.

Connected with each key on the keyboard is a stop-bar extending rearwardly underneath the keyboard, which forms definite stops destined to limit the movement of those parts of the machine which actuate the accumulating mechanism and cause the recording devices to print a number corresponding to the keys in action. The action of these keys is simply to set the machine in a certain condition to stop at predetermined distances certain other movements in the machine which must be actuated by some other motor than the key itself. In the present instance we employ a lever or handle, pivoted to one side of the machine convenient to the movement of the hand operating the keyboard. Power-motors may be employed in place of the handle if connected by some clutch or key-trip device to the same operative rods as the handle referred to.

Assuming the machine to be "clear," meaning thereby that the machine is ready to start a new addition as distinguished from adding to a previous amount registered in the machine, the several things to be performed by the machine in the process of forming and adding a column of figures and the action of the machine will be best understood by taking an example. For instance, add 15
66
—
81

To print the first figure, the "5" in the units-column and the "1" in the tens-column would be depressed, which keys remain down, after which the handle would be drawn forward to its limit and permitted to go back to its position of rest. This would print the number "15" on the paper. Next depress the "6" key in the tens-column, the "6" key in the units-column, and repeat the movement of the handle. This would print "66." We are now ready for a total. As the above series of figures were printed certain wheels within the machine, called "accumulator-wheels," were caused to revolve through distances that correspond to the amount of the above figures when added together. Now to print the total we must depend upon other means for adjusting the type-sectors than the stop-bars. These other means lie within the limits of and are fixed upon the accumulator-wheels, and by depressing the total-key a movement of the handle will cause the accumulator-wheels, through racks to be described, to turn backward, stopping the accumulator-wheels at the clear, at the same time bringing the type necessary to print the total in position on the printing-line.

In case an error be made in depressing the keys on the keyboard—for instance, in the above example if instead of depressing the keys for "66" the eighth key in the units-column had been depressed and it was desired to correct this error—the small key at the foot of the units-column would be depressed and immediately the key numbered "8" in the units-column would rise to its normal place and the "6" in the units-column could then be depressed. Similar correction-keys will be found at the foot of each column of figures.

Referring to the drawings, similar letters and numbers will be used in the various figures to denote the same or similar parts.

The machine is mounted upon a rectangular metallic base 1, on the right side of which, near the rear end, is erected a rectangular side frame 2 and on the left-hand side a similar frame 3. These frames are in the form of plates with the unnecessary spaces cut away, as is done in clockwork and other machines of this character. The side frames 2 and 3 are secured to the base 1 by brackets 4. Extending forward of the front edge of the frames 2 and 3 is the keyboard, consisting of keys $x$, which are mounted on the vertical stems 6. These stems 6 pass through an inclined metallic plate 7, which forms the top of the keyboard, and through the metallic plate 8 farther down. Inasmuch as the keys $x$ are arranged in columns, extending from the front to the back of the keyboard, and the mechanism within the machine for each column of the keys $x$ are practically duplicates of the mechanism of each of the other columns of keys $x$, but one set will be described, except where all the parts operate to perform some function common to all of the columns of keys $x$ or where the operating mechanism of one column automatically brings into operation some feature in the mechanism of the other columns. The operation of the key $x$ serves to draw the stop-bar 9 forward. There is a separate stop-bar 9 for each key $x$ in each column. There is also a stop-bar 17, which has no key $x$. These ten stop-bars are arranged and held within a nest 10. The key $x$ serves to depress one end of the bent crank 11, the other end of which engages between two upright ears 12 on the upper edge of the stop-bar 9. The crank is pivoted at 13, the pivot to be secured in the nest 10. A small spring 14 tends to keep stop-bar 9 in its backward position and the key $x$ to its normal level. When the key $x$ is depressed, the corresponding stop-bar 9 is drawn forward until a small notch 16 on its under side drops over a ridge-bar 15, which extends from side to side across the base 1. All of the stop-bars 9 rest upon the upper face of the ridge-bar 15 when disengaged. The stop-bars 9 are of various lengths, the longest being for the key numbered "1." Each of the other stop-bars 9 is shorter by a fixed amount than the stop-bar 9 for the key $x$ having the next lower number, the stop-bar 9 for the key numbered "9" being the shortest except the stop-bar 17, which has no key $x$. On the upper side of the stop-bars 9 by a lug is formed a vertical face 20, which is exactly in line across the entire ten bars in a given nest 10 when none of the keys $x$ are depressed. A small pendulum 22 is so suspended that it touches the face 20 of all the stop-bars within one nest 10. This pendulum 22 is swung on a shaft-rod 23, which extends from the side frame 2 to side frame 3. Each pendulum 22 has a small pin 24, extending to the left and overlapping the pendulum 22 of the nest 10 next above. (See Figs. 2, 3, 8.) This pendulum 22 also touches the vertical face of the lug 18 on the stop-bar 17. The stop-bar 17 is the shortest one within any nest 10 and stops the printing-sector 102 with 0 on the printing-line. It is held in its normal position by spring 19. When no key is depressed, there will be no opposition to the movements of the type-sectors by any stop-bar, and the type-sector 102 will raise all the types above the printing-line. Now to print a number like "500" it is only necessary to depress the key numbered "5" in the hundreds-column, and the stop-bar 9 corresponding to the fifth key will draw the pendulum 22 forward. This pendulum 22, in connection with the nest of stop-bars 9 corresponding to the hundreds-column, lifts the point 24, extending to the left from the pendulum 22, over the tens-column, so that the pendulum 22 over the tens-column moves forward. The pendulum 22 over the tens-column lifts the pin 24, extending to the left from the pendulum 22, over the units-column, so that its pendulum 22 will also move forward. This forward movement of the pendulum 22 over the tens-column and the units-column moves the stop-bar 17 in the tens and units columns forward and they engage the ridge-bar 15 by the notches 16 on their under side. In this way a key depressed in any column automatically sets the stop-bar 17 for "0" in each column below. Formed on each of the stop-bars 9 is a lug 21, having an inclined face forward, which lug engages a tilting lever 25. This lever is made in the form of a loop on its lower side, as clearly shown in Fig. 11. This lever 25 is pivoted on a rod 26, which extends from the frame 2 to the frame 3 across the machine. The upper end of the lever 25 engages the lower end of the bent lever 27 (see Fig. 14) and serves to push it backward, swinging it on a pivot 28, which pivot 28 is secured to a lever 29, mounted on a rod 30, extending from frame 2 across the machine to frame 3. When the lever 27 is operated upon by the lever 25, its upper end comes under the horizontal bar 32, which is called the "depressing-bar," and which will be described later. The lever 27 is held in its normal position by a small spring 31.

The foregoing description comprises all of the parts of the machine and their movements that are operated by the depression of the keys. The machine is now ready for the operations which will be performed by movements derived from another source of power. If, however, an error has been made in depressing the keys $x$, as before explained, and correction is desired, the key 33 at the foot of the column containing the error should be depressed. This key 33 connects with a lever 34, pivoted at 35 to the side of the nest 10, and has a lip 36 extending under the nest of stop-bars 9. The depression of the key 33 will raise the lip 36 and disengage all of the stop-bars 9 within that particular nest 10 from the ridge-bar 15. The proper key $x$ may then be depressed. The next operation of the machine is the movement of the handle 37, which handle is pivoted at 38 and carries a small parallel lever 39 within the case. The lever 39 is pivoted to a connecting-rod 40, which in turn is pivoted to a swing 41. This swing 41 is clearly shown in Fig. 10 and is pivoted at 42 to the swinging bars 43, said bars 43 being hung on pivots 44 to the side frames 2 and 3. The swing 41 has at its upper end extensions 45 beyond the edges of the swinging bars 43. These extensions have stop-pins 46 in front and stop-pins 47 behind. The swinging bar 43 is held in its normal position by the spring 48, connected to the side frames 2 and 3. Pivoted to the stop-pin 47 is an irregular-shaped bar 49, called the "shuttle." This shuttle 49 has a tapering front end and is wider at the front part than it is at the back. The decrease in width is made at a tapering edge 50. The fixed stud 51 is secured to the side frames 2 and 3 and the movable stud 52 is secured to the side of the loop which forms the depressing-bar 32, the ends of said loop 32 being pivoted at 53 to the side frames 2 and 3. When the tapering end of the shuttle 49 is entered between the studs 51 and 52, stud 52 is depressed, carrying with it the depressing-bar 32, holding it down until the wide part of the shuttle 49 has passed the stud 52, when the depressing-bar 32 and stud 52 resume their normal position. On the return movement of the shuttle 49 the tapering edge 50 strikes the stud 52 and passes over it without depressing the bar 32. Shuttle 49 instead of catching the stud 52 springs outward over the inclined end of the stud 52 and does not depress said stud 52 or the depressing-bar 32. The depression of bar 32 causes the depression of all of the levers 27 whose upper ends are beneath it. This depression of the lever 27 carries with it the lever 29 against the tension of spring 54, which tends to hold the levers 29 and 27 in their normal position. The stud 55, secured to lever 29, engages in a slot 56 within the horizontal rack 57, and when said rack 57 is depressed by said stud 55 it engages a small pinion 58, which revolves loosely upon the shaft 59, secured in the side frames 2 and 3. The rack 57 is pivoted at its back end by the pivot 60 to an upright sliding carriage 61. This carriage 61 is guided at its upper end by the perforated ears 62, sliding on a rod 63, extending lengthwise of the machine, and is secured at its rear end in a cross-bar 64, which extends from one side plate 2 to the other side plate 3, and at its front end by a similar bar 65, similarly held. The lower end of the sliding carriage 61 slides freely in a groove 67 in plate 66. (See Fig. 13.) Secured to this carriage 61 is a horizontal piece 68, projecting forward. Secured to the middle of the carriage 61 is a spring 69, the front end of which is connected to the cross-bar 70. This cross-bar 70 slides forward and backward, guided by guide-rods 71, the ends of which are secured in the front and back parts of the side frames 2 and 3, as shown in Fig. 9. The means for sliding the rod 70 is the connecting-rod 72 between the swinging bar 43 and the end of the rod 70, so that when the swinging bar 43 is brought forward by means of the handle 37 it carries with it the bar 70. This puts a tension on the spring 69 and causes the sliding carriage 61 to move forward until it meets some obstruction which stops its further progress, after which the spring 69 extends under tension. The obstruction which the piece 68 can meet with is one of the various stop-bars which may be engaging ridge-bar 15, as it will be seen that any stop-bar 9 which has fallen over the ridge-bar 15 presents its back edge on a line below the other stop-bars 9 or stop-bar 17 within the nest 10. When none of the stop-bars are in engagement with the ridge-bar 15, the piece 68 meets no obstruction and the carriage 61 comes forward to its extreme position. When the key x, numbered "1," is depressed, the longest stop-bar 9 engages the ridge-bar 15. The sliding carriage 61 now coming forward causes the rack 57 to rotate the pinion 58 a distance of one tooth. The rack 57 is brought into engagement with the pinion 58 by the action of the shuttle 49, which depresses the stud 52 and carries with it the depressing-bar 32. The lost motion between the pins 46 and 47 enters the shuttle 49 between the studs 51 and 52 before the loop 43 is moved. The bar 32, through the levers 27 and 29, depresses the stud 55, which in turn lowers the rack 57 until it is in engagement with the pinion 58. When the handle 37 is at its extreme forward position, the wide part of the shuttle 49 is past the stud 52 and permits the depressing-bar 32 to rise to its normal position. This permits the spring 54 to raise the rack 57 out of engagement with the pinion 58. The inclined edge 50 of the shuttle 49 now passes on the outside of the stud 52 and does not depress the bar 32 on the return stroke of the handle 37. If the second key x (marked number "2") is depressed, the piece 68 can come forward, so that the rack 57 will rotate the pinion 58 a distance of two teeth. If any other key be depressed, it will stop the piece 68 at a position where the rack 57 will rotate pinion 58 a number of teeth to correspond to the number on the key x so depressed. If no key x be depressed, the spring 69 will carry the carriage 61 forward; but the rack 57 will not be in engagement with the pinion 58. Consequently the pinion 58 will not rotate. In engagement with pinion 58 and immediately above it is a larger pinion 73, known as the "accumulator-wheel." This pinion-wheel 73 is mounted upon shaft-rod 74, which is secured to the side frames 2 and 3. The accumulator-wheel 73 has secured to its hub at a distance to the left a disk 75, and to this disk is secured a number of small pins 76, which extend still farther to the left. The accumulator-wheel 73 has thirty teeth, and the disk 75 has three pins 76 extending therefrom placed equally distant apart, so that there are ten teeth from one pin 76 to the next one. The accumulator-wheel 73 may have any multiple of ten as its number of teeth—that is, if the machine is to add on the decimal system; but if some irregular system be employed, as the English-money system of pounds, shillings, and pence, then the number of teeth between the pins 76 will be equal to the number of units in one column that equal one unit in the next higher column and the accumulator-wheel 73 would have a multiple of that number of teeth. The spring-pawl 77 prevents the accumulator-wheel 73 from any movement by its own momentum and serves to keep the teeth always in position, so that the rack 57 will engage the pinion 58, the pinion 58 being wide enough on its face to accommodate both the accumulator-wheel 73 and the rack 57.

In the front of the accumulator-wheel 73 is a small horizontal hook 78, the point of which extends between the disk 75 and the accumulator-wheel 73 in the next column above. This hook 78 engages the retaining-bar 79, which extends from side to side of the machine and is supported by the side frames 2 and 3. Portions of the front edge are removed to permit the free movement of the upper ends of the levers 27. A spring 80 serves to keep the hook 78 in position under tension. The hook 78 is pivoted to the wing 81, which swings on a rod 82, secured to the side frames 2 and 3, and has a tendency to swing forward by the tension of the spring 83. The front side of the wing 81 has an inclined edge 84, as clearly shown in Fig. 16, the object of which will be later explained. On the left of the wing 81 is a pawl 85, called the "carry-pawl," which engages the teeth of the accumulator-wheel 73 and is held in engagement by the spring 86. The stop-rod 87, extending underneath it from side to side of the machine, limits its downward movement. The carry-pawl 85 does not engage the teeth of the accumulator-wheel 73 directly behind the wing 81, but engages the accumulator-wheel 73 in the next column above. Over the accumulator-wheel 73 is a third pawl 88, known as the "limit-pawl." This pawl permits the accumulator-wheel 73 to revolve a distance of one tooth while it is in engagement. It is mounted on a hinged plate 89, which swings on pivots 90, engaging the side plates 2 and 3. A small arm 91 extends back of the pivot 90 and under the side of the loop 32, so that when loop 32 is lowered pawl 88 is lifted out of engagement with accumulator-wheel 73. The plate 89 by gravity brings the pawl 88 into engagement with 73, and the small spring 92 serves to hold the pawl 88 in its forward position. Referring to Fig. 11, there will be seen a diagonal bar 93 extending from the pivot 94 on the frame 2 across the front of the machine. The left end of bar 93 has a connecting-rod 95 fastened thereto, which extends downward to a wheel 96. The wheel 96 is loosely mounted on a pivot 97, and on the same pivot there is also loosely mounted a pinion 98. This pinion 98 carries with it a ratchet-wheel 99. On the side of the wheel 96 there is fixed a spring-pawl 100, engaging ratchet-wheel 99, so that when the pinion-wheel 98 is revolved in one direction wheel 96 will remain stationary, ratchet-wheel 99 passing the pawl 100, but when revolved in the other direction will carry pawl 100 and wheel 96 with it. The rack 101 is connected at its rear end to the swinging bar 43. It will thus be seen that the forward movement of the handle 37, carrying the swinging bar 43 forward, and with it the rack 101, will rotate the pinion 98 in a forward direction; but the wheel 96 will remain stationary. The pawl 100 ratchets past the wheel 99, and on the return stroke of the handle 37 the rack 101 will rotate the pinion 98 in a backward direction, and thus will cause the wheel 96 to revolve. By the wheel 96 the left-hand end of the bar 93 will be drawn down during the first half of the revolution. The second half of the revolution the wheel 96 will permit the bar 93 to return to its higher position, assisted by the spring 91. The object of these pawls 88 and 85 and the wing 81 and its connecting mechanism is to accomplish the transferring from one column to the next column above whenever the units within any given column exceed nine. This end is accomplished in the following manner: For instance, if the key numbered "5" is depressed and the handle 37 is brought forward the rack 57 will rotate the pinion 58 through a distance equal to five teeth. This in turn will rotate the accumulator-wheel 73 a distance of five teeth in a reverse direction. Now we assume that the machine was "clear" before starting. In this position one of the pins 76 would be immediately above the hook 78. Now if the key be again depressed and the handle 37 brought forward the rack 57 will cause the pinion-wheel 58 and the accumulator-wheel 73 to revolve through a distance of five teeth. The accumulator-wheel 73 will now have revolved a total distance of ten teeth. This will bring the second pin 76 into the position in which the first one was when the machine was clear. In doing so it will lift the hook 78 out of engagement with the retaining-bar 79 and permit the wing 81 to spring forward, as shown in Fig. 3. This will cause the pawl 85 to move forward a distance of one tooth, and it will then rest upon the next tooth. Now when the handle 37 assumes its normal position it will cause the shearing-bar 93 to descend and strike against the inclined edge 84 of the wing 81. This will swing the wing 81 back to its vertical position. The downward movement of the shearing-bar 93 strikes the extreme right-hand wing 81 first. After bringing it to the vertical, so that hook 78 will again engage bar 79, it strikes the next wing 81, bringing it to the vertical, and so on, bringing the wings 81 successively to the vertical, beginning at the right-hand side of the machine and ending on the left. This is accomplished by having the inclined edges 84 of the wings 81 so arranged that the shearing-bar 93 entirely passes one inclined edge 84 before it strikes the next one to the left. When the wing 81 is returned to its normal vertical position, the pawl 85 will rotate the accumulator-wheel 73 in the column above a distance of one tooth, and the hook 78 will engage the retaining-bar 79, this being the amount permitted by the limit-pawl 88. This action is identical in all of the transferring devices engaging all of the accumulator-wheels 73, except the one at the extreme left, there being nothing for this accumulator-wheel to transfer to. In short, the action of the accumulators may be described as follows: Starting at the clear, the accumulator-wheel 73 can be rotated a distance of nine teeth without affecting the next accumulator-wheel above; but when one tooth more is added, making ten, there is, by the transferring device, one tooth added to the next accumulator-wheel 73 above. When the accumulator-wheel 73 has revolved a distance equal to ten teeth, it moves one tooth on the accumulator-wheel 73 in the next column above, and this is true irrespective of any independent movement of the accumulator-wheels 73.

Back of the accumulator-wheel 73 and the transferring mechanism there are a series of type-levers 102 made with two arms, the front one bearing segmental type-sectors 103, the type 104 of which are fixed thereto and face the inner side. These type-levers 102 are pivoted on a shaft-rod 105, which extends from side to side across the machine and is secured to the frames 2 and 3. (See Fig. 13.) One arm of the type-lever 102 terminates in the slot 106, which engages the stud 107 on the side of the sliding carriage 61, so that when the carriage 61 moves forward the sector 103 swings upward. The space between the type 104 is so arranged that when the sliding carriage 61 moves forward, so as to register one tooth on the pinion 58 and accumulator-wheel 73, the type-sector 103 will bring the first type 104 into the printing-line opposite the center of the printing-roller. When the key x numbered 5 is depressed, the carriage 61 may move forward and rotate the accumulator-wheel 73 a distance of five teeth and will raise the sector 103 through a space of five type and bring a number "5" type in the printing-line. If no key x is depressed the sliding carriage 61 will go forward to its extreme position, as shown at 108, Fig. 3, and this will raise the sector 103 to a position so that the last type 104 will have passed the printing-line. There are ten types on each sector 103, numbered from "1" to "9," with the "0" succeeding the "9."

When any number of keys x have been depressed and the handle 37 has been drawn forward and allowed to return, this return movement disengages all of the stop-bars 9 from the ridge-bar 15 in the following manner: The bar 109 extends from side to side across the machine beneath the stop-bars 9. This bar 109 is pivoted to the base 1 at 110 and has extending upward a short arm 111, which is connected to a rod 112, connecting the lever 113. The lever 113 has a weighted arm 114 extending backward, which tends to keep the lever 113 upright. There is a slot 115 over the stud 116 in the lever 113. A trip 117 extends down from the left-hand end of the bar 70, so that it engages the end of the upright lever 113 as it moves back and forth. On the forward movement of the bar 70 the trip 117 pushes the lever 113 forward, and the stud 116 moves forward in slot 115 of the connecting-rod 112. With the return movement of the bar 70 the trip 117 strikes the upper end of the lever 113 and carries the connecting-rod 112 forward. This swings the arm 111 backward and raises the front edge of the bar 109, which lifts all the stop-bars 9 and 17 out of engagement with the ridge-bar 15.

The printing device consists of a series of rollers for holding the paper and mechanism for holding the copying-ribbon. On the sides 2 and 3 are pivoted upright levers 118 by pivots 119. These levers carry at their upper ends a roller 120. Set back of the center line of the arms 118 lower down and in line with the center is a roller 121. These rollers are both pivoted in the upright lever 118, and resting on the rollers 120 and 121 is a third roller 122, weighted heavily to make it retain its position by gravity alone. On the front edge of the side frames 2 and 3 is secured a cross-bar 123, upon which are mounted vertical brackets 124 at the right and left hand ends. Near the upper end of the brackets 124 is a small lug 126, extending inward toward the center of the machine.

127 is a loop which supports the ribbon-carrying device and which is mounted upon the lugs 126, which pass through slots 125 in the sides of the loop 127. The copying-ribbon is carried on reels 129, which are mounted in a frame 128. (See Fig. 21.) This frame 128 has pivots 130 at its lower front edge which engage small lugs 130$^a$ on the lower front edge of the loop 127. The lug 126 is not as wide as the slot 125, which permits of a lateral movement of the loop 127, which carries with it the frame 128 and the copying-ribbon. A spring 131 tends to hold the loop 127 backward. From the bottom of the frame 128 there extends an inclined bar 132. By referring to Fig. 22 it will be seen that if the loop 127 is drawn forward the inclined bar 132 will raise the frame 128 upward, swinging it on the pivot 130. The loop 127 has arms 133 extending backward, which carry the end of the rollers 134. These rollers 134 are in contact with the roller 122. Besides the roller 129 on the frame 128 there are vertical guide-rollers 135, which direct the course of the copying-ribbon. From this it will be seen by referring to Fig. 18 that there is an open space 136 inside the center of the loop 127. Through this space the type-sectors 103 rise. Now when any of the keys x are depressed and the handle 37 is moved forward the corresponding type-sectors 103 will be raised and the type 104 will be brought to the printing-line, which is directly opposite the center of the roller 122. Referring to Fig. 15, it will be seen that as the bar 43 moves forward stud 137 will move forward in the slot 138 of the connecting-bar 139, which connects to the arm 118. The length of the slot 138 is such that the stud 137 strikes the end of the slot 138 only with the last part of the movement forward of the swinging bar 43. This movement carries the arm 118 forward, which in turn moves the rollers 120, 121, and 122, thereby pressing the loop 127 forward by the contact between the roller 122 and the rollers 134, which movement lifts the frame 128 upward by means of the inclined bar 132 and brings the copying-ribbon before the face of the type 104, so that the roller 122 will press against the copying-ribbon and in turn press against the line of type 104 on the sectors 103. Referring to Fig. 22, it will be seen that the paper upon which the printing is to be done has passed downward in front of the roller 120 and around the roller 122 between the rollers 121 and 134. When the handle 37 is released and it regains its normal position, the roller 122 moves backward and the copying-ribbon drops below the printing-line, which shows a view of what has been printed. The movement of the loop 127, which carries with it the frame 128, causes the reel 129 to pass by the spring-pawls 140. These pawls engage teeth in the periphery of the reel 129. The said pawls 140 are mounted upon the sliding bar 141, which bar is operated by the lever 142 and when pushed to one side brings one pawl 140 into engagement with one of the reels 129, putting the other pawl 140 out of engagement with the opposite reel. When the copying-ribbon is nearly all wound onto one of reels 129, the lever 142 is shifted, which brings the other pawl 140 into engagement, and the ribbon begins to wind on the other reel 129.

In order to print a total, a small key 143, situated at the left-hand side of the keyboard, is depressed. This key 143 depresses one end of a lever 144, the other end of which raises the bar 145, which extends from side to side of the machine and is supported at its ends in the levers 146, which are pivoted to the side frames 2 and 3 by 147. This bar 145 extends through slots 148 in racks 149, which are pivoted at 150 to the sliding carriage 61. The front ends of the levers 146 have a connecting-rod 151 extending to the short lever 152, also pivoted to the side frames 2 and 3, the front end of which support the lift-rod 87. When the key 143 is depressed, the lever 144 raises the bar 145 and brings the racks 149 into engagement with the pinion-wheel 58 and by the connecting-rod 151 raises the bar 87 and disengages the pawl 85. If the handle 37 is now drawn forward, the rack 149 will revolve the pinion 58, which will reverse the accumulator-wheel 73 until the pin 76, which has last passed the hook 78, comes in contact with the upper side of said hook 78. This will stop further travel of the rack 149 and the sliding carriage 61, and the type-sector 103 will elevate a type of the number equal to the number of teeth between the hook 78 and the pin 76. Referring to our previous example, it will be seen that in the units-column the accumulator-wheel 73 has revolved forward five and six teeth, making eleven, and has brought the second pin 76 above the hook 78. In the tens-column one tooth and then six teeth were revolved by means of handle 37 and the keys $x$ and one tooth by the carry-pawl 85, making eight altogether, so that the second pin 76 is eight teeth above the hook 78. Now when the total-key 143 is depressed and the handle 37 is brought forward the accumulator in the tens-column will revolve backward eight teeth before the pin 76 strikes the hook 78. This will permit the type-sector 103 in the tens-column to bring the figure "8" on the printing-line. The accumulator-wheel 73 for the unit-column will revolve backward one tooth and bring the figure "1" on the printing-line. Now if the example had been to add 65
15
—
80 it will be seen that the accumulator-wheel 73 in the units-column will revolve just ten teeth and bring the second pin 76 in place of the first one when the machine was clear. Therefore the rack 149 in the units-column will not come forward and the unit type-sector 103 will not rise, and in order to print the "0" in the units-column a small lug 153 is pivoted in front of each type-sector 103 on a rod 154, so that it will rest across the upper end of the type-sector 103 when the same is at rest in its normal position. The end of the lug 153 has an "0" type-face upon it and is of such length that the "0" is in line with the type on the sector 103. Each lug 153 has a pin 155 extending to the right and over the next succeeding lug 153, so that when any one lug 153 is swung upward on the pivot 154 it will carry with it all the other lugs 153 to the left, leaving those to the right. So in the example given the type-sector 103 in the tens-column will swing up the lug 153 of that column, which in turn will raise all the lugs 153 for the columns above it, but will leave the lugs 153 over the units-column type-sectors 103 to print the "0" in the "80." If in taking a total it is desired to clear the machine, the total-key 33 is released, when the handle 37 is drawn forward to its limit. This disengages such racks 149 as are in engagement with the pinion 58, and on the return of the handle 37 to its normal position the sliding carriages 61 return to their normal position with neither rack 57 nor 149 in engagement with pinion 58, which therefore remains stationary, and the pins 76 will be just above the hooks 78 in each column of the machine. If, however, it is desired to go on adding to the previous amount, the total-key 33 is held down, while the handle 37 is returned to its normal position. This keeps the racks 149 in engagement with pinion 58, which goes back to its position before taking the total. If it is desired to add the same amount a number of times in succession, it is not necessary to depress the keys $x$ each time the key $155^a$, (see Fig. 15,) called the "multiplying-key," is held down. This key $155^a$ is connected to the lever 156, pivoted to the side frame 2, and the inner end of which is connected to bar 157. A slot 158 engages a pin on the weighted arm 114. When the key 155 is depressed, the bar 157 raises the arm 114 and swings the lever 113 out of the path of the trip 117, so that the stop-bars 9 and 17 are not restored to their normal position so long as key $155^a$ is held down, and while it is held down the handle 37 may be operated as many times as desired, and at each operation the machine will print and add the amount registered on the keys $x$.

The machine is not confined to the adding of systems of moneys, but may be constructed to add any system where there are units of various degrees of magnitude, as in linear measurement of inches, feet, and yards, or miles, or in cubic units, like quarts, pecks, and bushels, by designing the accumulator-wheels 73 with such a number of teeth that the pins 76 are separated by a number of teeth equal to the number of units required in any column to equal the unit in the next higher column.

The difficulty experienced in printing from an irregular number of type with the same platen travel and pressure is overcome in the following manner: A small projection 159, faced with a yielding substance, like rubber, is formed on a type-sector 103 in line with a roller 121 when the type-sector 103 is at its highest position, as shown in Fig. 3. From this it will be seen that the type on the type-sector or "0" printing-lug 153 will be on the printing-line opposite the center of the roller 122, or the projection 156 will face the roller 121. In this way the pressure is equalized and the printing-rollers always encounter the same number of resisting-surfaces. For each column of keys there will be presented either a type to print on the paper or a projection 156 for roller 121.

Having described my invention, I claim—

1. The combination of a column of keys, a separate sliding stop-bar connected to each key, each stop-bar when operated dropping below the level of the other stop-bars, an adding device, a printing device, a carriage positively connected to the printing device, the movement of said carriage being limited by the said stop-bars when in operation; substantially as described.

2. An adding-machine as described comprising a system of geared accumulating devices, independently-operated toothed racks for turning said accumulating devices in one direction when adding, total-racks for turning said accumulating devices in an opposite direction, a system of stops to limit the travel or movement of said independently-operated racks when in engagement with said accumulating devices, other stops to limit travel or movement of said total-racks when in engagement with said accumulating devices, means for operating said independently-operated racks, and said total-racks so that each shall move from the same point at the same time, and a printing device coöperatively connected therewith.

3. In combination two or more sets of independent keys loosely mounted to operate sliding stop-bars in one direction, a transversely-mounted bar for holding said stop-bars in a retracted and lowered position, an independently-mounted stop-bar for printing 0's when and where desired operatively connected therewith, independent error-keys for each column of keys to restore any lowered stop-bar independently, and automatic restoring device transversely disposed to operate said stop-bars conjointly; substantially as described.

4. The combination of a series of columns of independent keys, of graded stop-bars slidingly connected therewith, an 0 stop-bar for each column of keys, means for automatically operating said 0 stop-bars conjointly with other like stop-bars when it is desired to print 0's to the right of a figure, means for holding all of said stop-bars in an elevated position, means for retaining said stop-bars within the path of other moving parts of the machine, automatic lift for restoring said stop-bars to a position out of the path of travel of other parts of the machine; substantially as described.

5. The combination in a machine of the kind described, of sliding stop-bars of graded length operatively held above the line of travel of the accumulator stop devices, keys for operating said sliding stop-bars independently, a transverse bar for holding said stop-bars out of engagement, notches formed in one edge of said stop-bars for engaging said transverse bar when it is desired to operate the machine for adding, recording devices connected to the accumulator-actuating devices, said actuating devices arranged to abut against said limiting devices when engaging said transverse retaining-bar; substantially as described.

6. A column of independent keys loosely connected to and operating stop-bars, a series of retracting sliding stop-bars of graded lengths, which in operation drop below the level of other stop-bars thereby limiting the movement of the adding and recording devices conjointly; substantially as described.

7. The combination of a series of columns of independent keys, of graded stop-bars connected therewith, and an 0 stop-bar for each column of keys, means for automatically bringing the 0 stop-bar into engagement in all columns where it is desired to print an "0" conjointly with the stop-bar operated by the key; substantially as described.

8. The combination of the keyboard and sliding stop-bars which in operation drop below the level of the other stop-bars for limiting the movements of the adding mechanism, of a printing device and an adding device having a positive mechanical connection between them; substantially as described.

9. In an adding-machine the combination of stop-bars connected to the keys and the 0 stop-bar without a corresponding key, of means for operating the 0 stop-bar by both the key-operated stop-bars and the 0 stop-bar in the column above; substantially as described.

10. The combination of a series of columns of numbered keys, each key connected to an independent stop-bar of length to correspond to the number on the connected key, an 0 stop-bar without connected key arranged to be automatically operated by the operation of either the key stop-bars or the 0 stop-bar in the column to the left, substantially as described.

11. The combination of a series of columns of numbered keys, each key operating an independent stop-bar, of length to correspond to the number on the key, and a separate error-key for disengaging the stop-bars under each column of keys, substantially as described.

12. The combination in an adding and recording machine, of columns of keys connected to operate sliding stop-bars, pinion-wheels engaging the accumulator-wheels, operative connections between said stop-bars and pinion-wheels and means for revolving said pinion-wheels in one direction when adding and in the reverse direction when taking the total; substantially as described.

13. The combination in an adding and recording machine a keyboard having columns of independent keys, stop-bars connected to said keys, pinion-wheels for operating the accumulating devices, operative connections between said stop-bars and pinion-wheels and racks above and below said pinion-wheels, which are alternately brought into engagement with said pinion-wheels when adding and taking the total, substantially as described.

14. The combination of a keyboard having columns of independent keys operating sliding stop-bars, pinion-wheels for operating the accumulating devices, racks for rotating said pinion-wheels, operative connections between the stop-bars and the pinions and the type-sectors for printing the amounts added and the totals, the said racks and type-sectors being both positively connected to the same operative mechanisms, substantially as described.

15. In an adding and recording machine, type-sectors bearing type numbered from one to nine and having an 0 after the nine, and an independent 0 before the one so arranged that when any type-sector is brought into operation it moves all the independent 0's in the higher columns out of the printing-line, substantially as described.

16. An adding-machine of the kind described consisting of two or more interchangeable sets of keys having stems, each key arranged to operate a bent lever in but one direction, bent crank-levers pivoted with one arm within the path of one of said keys, and the other arm operatively connected to a stop-bar, stop-bars of graded length, means for holding the graded ends of said stop-bars in an elevated position, means for holding graded ends of said stop-bars in a lowered position, means for restoring all depressed stop-bars to an elevated position simultaneously, means for restoring any one of said stop-bars independently, stop-bars for limiting the travel of other parts of the machine when it is desired to print 0's automatically, overlapping pendulums in connection with said stop-bars, operative connections between the keys and said overlapping pendulums, 0 printing-type connected to print "0's" automatically in connection therewith, substantially as described.

17. An adding-machine of the kind described consisting of two or more sets of keys, each arranged to operate a bent lever in but one direction, bent levers for each of said keys, said bent levers pivoted with one free arm within the path of each one of above keys and connected to stop-bars of graded length, stop-bars graded as to length with respect to point of connection with above said keys, means for holding the graded ends of said stop-bars in an elevated position, means for holding graded ends of said stop-bars when in a lowered position, means for restoring said stop-bars to an elevated position simultaneously, means for restoring any one of said stop-bars independently, a stop-bar for limiting the travel of other parts of the machine when it is desired to print 0's automatically, means for operating said stop-bars conjointly with other like stop-bars, substantially as described.

18. An adding-machine of the kind described consisting of a keyboard, key-operated stop-bars, accumulating devices, independently-mounted racks for turning said accumulating devices in one direction, racks for turning said accumlating devices in an opposite direction, means for transferring motion from one accumulating device to another like device consecutively, type-bearing printing-sectors operated by handle or other motive power so that said type-bearing sectors shall move uniformly with said handle or other motive power when no key has been operated; means for limiting the movement of said type-bearing sectors independent of the stop-bars, means for limiting said type-bearing sectors for printing 0's when and where desired, means for printing 0's independently of said type-bearing sectors when the total-key is operated for printing a total, substantially as described.

19. An adding-machine of the kind described consisting of detainable keys, loosely-mounted bent connecting-levers within the path of said keys, stop-bars connected to said bent connecting-levers, means for holding one end of said stop-bars in a forward elevated position, means for holding one end of said stop-bars when in a lowered position, a lever for elevating said stop-bars simultaneously, keys for elevating said stop-bars independently, sliding devices mounted to stop against or pass beneath said stop-bars at the will of the operator, connection between said sliding devices and the racks for operating the accumulators, and printing or recording devices.

20. In an adding-machine the combination of sliding stop-bars and the engaging and overlapping pendulums, for operating the 0 stop-bars in the column below; substantially as described.

21. In an adding-machine the combination of a sliding carriage, a rack connected thereto, a pinion for rotating the accumulator-wheel, means for bringing said rack into engagement with said pinion on a forward movement of the carriage in columns where keys have been depressed, and means for automatically disengaging said rack on the return movement of the carriage; substantially as described.

22. In an adding-machine the sliding carriage, a special rack connected thereto for taking the total, a pinion for operating the accumulating device, and means for engaging said rack with the pinion for rotating the accumulator-wheel so that when the carriage moves forward the rack will reverse the accumulator-wheel and means for disengaging the rack or leaving it in engagement with the pinion at the end of the forward stroke of the handle at the will of the operator; substantially as described.

23. In an adding-machine a series of accumulator-wheels, pins secured to said wheels and separated by a distance of ten teeth, wings for carrying hooks within the path of said pins, and a shearing-bar for restoring said wings whenever the hooks have been disengaged, pawls connected to said wings and engaging the next accumulator-wheel above, and means for rotating said accumulator-wheel above one tooth after said pin engages said hook; substantially as described.

24. The combination in an adding-machine of a series of accumulator-wheels and a carrying device having a pawl engaging the accumulator-wheel above, which is released by pins secured to said accumulator-wheels, a shearing-bar which operates to successively reëngage all of said carrying devices beginning at the lowest column and ending at the highest; substantially as described.

25. In an adding-machine a carrying device consisting of swinging wings carrying pawls and provided with inclined forward edges, a descending bar acting on the inclined edges successively from the right side to the left side of the machine and holding said wings in an engaged position until all are brought into engagement; substantially as described.

26. In an adding-machine a series of accumulator-wheels a series of limit-pawls arranged to engage all of said accumulator-wheels at the same time and permitting the accumulator-wheels to revolve one tooth while in engagement; substantially as described.

27. The combination with keys connected to independent sliding stop-bars, of pivoted type-sectors connected to sliding carriages, and sliding carriages whose movement is limited by said stop-bars; substantially as described.

28. The combination with a series of type-sectors, of a series of independent stop-bars connected to keys, for each type-sector and an automatically-operated 0 stop-bar for each type-sector, means for moving said type-sector, and means for restoring all of said stop-bars automatically; substantially as described.

29. In an adding-machine the combination of keys, each key connected to an independent sliding stop-bar, a series of accumulator-wheels, means for rotating said accumulator-wheels as many teeth as the number of the key depressed, type-sectors pivoted to swing a distance to correspond to the number on the key depressed and connected to the same moving part that operates the accumulator-wheel; substantially as described.

30. In an adding-machine the combination of keys, each key connected to an independent stop-bar, a series of accumulator-wheels, means for rotating said accumulator-wheels as many teeth as the number of the key depressed, type-sectors pivoted to swing a distance to correspond to the number on the key depressed and connected to the same moving part that operates the accumulator-wheel, and a device for printing 0's in taking totals without raising the type-sectors; substantially as described.

31. In a machine of the kind described the combination of accumulating devices and a printing device, a shuttle arranged to bring the accumulating mechanism into engagement with its operating mechanism before movement is imparted to the printing device on a forward stroke of the handle and arranged to release the accumulating mechanism before the backward movement of the handle begins; substantially as described.

32. In an adding-machine a handle connected to levers which successively bring into engagement racks with accumulator-wheels in the columns where the keys have been depressed rotate said accumulator-wheels and set the printing device, operate the printing device, and release the racks from engagement with the accumulator-wheels on the forward stroke of the handle, and restore the stop-bars and keys to their normal position on the return stroke of the handle; substantially as described.

33. In an adding-machine a printing device for printing a line of irregular number of type, of a series of lines of type and a corresponding series of contact pressure-surfaces, so arranged that the contact pressure-surface will be in engagement whenever the type do not print when the machine is operated; substantially as described.

34. A printing device consisting of a series of bars having type fixed thereon, a series of contact-surfaces, rollers for holding the paper and pressing against the type when the same are opposite the printing-line and against the contact-surface when the type are not opposite the printing-line, whenever the machine is operated.

DE KERNIEA J. T. HIETT.

Witnesses:
JOHN A. LUTZ, Jr.,
HALCOLM ELLIS.